(12) United States Patent
Jalagam et al.

(10) Patent No.: US 7,577,724 B1
(45) Date of Patent: Aug. 18, 2009

(54) METHODS AND APPARATUS ASSOCIATED WITH ADVISORY GENERATION

(75) Inventors: Sesh Jalagam, Santa Clara, CA (US); Sharon Yuet Mei Lam, Saratoga, CA (US)

(73) Assignee: EMC Corporation, Hopkinton, MA (US)

(*) Notice: Subject to any disclaimer, the term of this patent is extended or adjusted under 35 U.S.C. 154(b) by 445 days.

(21) Appl. No.: 11/390,900

(22) Filed: Mar. 28, 2006

(51) Int. Cl.
  *G06F 15/177* (2006.01)
(52) U.S. Cl. .................. 709/220; 715/734; 715/738
(58) Field of Classification Search ......... 709/220–223; 706/47; 715/734, 738
  See application file for complete search history.

(56) References Cited

U.S. PATENT DOCUMENTS

| | | | |
|---|---|---|---|
| 5,874,955 A * | 2/1999 | Rogowitz et al. | 345/589 |
| 6,966,033 B1 * | 11/2005 | Gasser et al. | 715/738 |
| 7,107,534 B1 * | 9/2006 | de Jong et al. | 715/734 |
| 7,155,514 B1 * | 12/2006 | Milford | 709/225 |
| 7,171,624 B2 * | 1/2007 | Baldwin et al. | 715/734 |
| 7,389,345 B1 * | 6/2008 | Adams | 709/224 |
| 7,403,987 B1 * | 7/2008 | Marinelli et al. | 709/223 |
| 7,434,109 B1 * | 10/2008 | Stabile et al. | 714/47 |
| 7,457,858 B1 * | 11/2008 | Levesque et al. | 709/223 |
| 7,475,363 B1 * | 1/2009 | Yehuda et al. | 715/853 |
| 2003/0105856 A1 * | 6/2003 | Tse et al. | 709/224 |
| 2003/0140128 A1 * | 7/2003 | Cox et al. | 709/221 |
| 2004/0205089 A1 * | 10/2004 | Alon et al. | 707/200 |
| 2007/0174768 A1 * | 7/2007 | Sen et al. | 715/700 |
| 2007/0192380 A1 * | 8/2007 | Tabellion et al. | 707/200 |
| 2008/0065748 A1 * | 3/2008 | Brisse | 709/220 |
| 2008/0154832 A1 * | 6/2008 | Kral et al. | 706/47 |

* cited by examiner

*Primary Examiner*—Paul H Kang
*Assistant Examiner*—Greg Bengzon
(74) *Attorney, Agent, or Firm*—Chapin IP Law, LLC

(57) ABSTRACT

A rule engine process maintains a set of rules for purposes of validating a storage area network configuration. The rule engine process has access to user-defined conditions indicating whether to generate respective rule message information (e.g., advisories) when applying one or more rules in the maintained set of rules. For example, during validation of a respective storage area network configuration, the rule engine process can apply or utilize the user-defined conditions to potentially prevent generation of advisories associated with one or more applied rules. Accordingly, a user such as a storage area network administrator can customize a respective rule engine (e.g., via the user-defined conditions associated with the rules) and, based on a subsequent application of the set of rules to a storage area network configuration according to the user-defined conditions, limit generation of error messages in the event that one or more respective rules happens to fail.

19 Claims, 14 Drawing Sheets http://localhost - Rule Condition(s) - Mozilla Firefox (Build 2006011112)

Rule ID: 5001

Rule Name: EMC Support Matrix is out of date

Category: EMC Support Matrix
Applies to Objects: Switch, HBA, Host, Array, Tape Device, Bridge, Distance Device, Tape Library

Description: Reports when the ESM version in SAN Advisor is out of date.

Conditions | Messages

○ Disable Rule
● Enable Rule  except when

| Object | Attribute | Operator | Value |
|---|---|---|---|
| Any | name | starts with | test |

Switch
HBA
Host
Array
Tape Device
Bridge
Distance Device
Tape Library
User Defined Group
Any 520-1

＋ Add Condition

Apply to Rule Set    Cancel 150-4

Copy Conditions - Microsoft Internet Explorer provided by EMC

Copy all conditions from
Rule ID: 6001
Rule Name: Component not connected
Conditions: User Defined Group name equals test or Bridge User Defined Group starts with (ignore case) test or Distance Device Custom Field Name contains (ignore case) name
to the selected rules:
0 Selected Conditions matched ▶ 15 of 144 Rules

| | Rule ID | Category | Rule Name | Object Type | Severity | State | Condition |
|---|---------|----------|-----------|-------------|----------|-------|-----------|
| ☐ | 5000 | EMC Support Matrix | Obsolete component | Multiple | Error | Enabled | No |
| ☐ | 5400 | EMC Support Matrix | Unable to check interoperability | Multiple | Info | Enabled | No |
| ☐ | 5511 | EMC Support Matrix | Tape library and connected device interoperability | Multiple | Error | Enabled | No |
| ☐ | 5512 | EMC Support Matrix | Tape device and connected device interoperability | Multiple | Error | Enabled | No |
| ☐ | 6002 | Availability | High availability to physical fabric | Multiple | Warning | Enabled | No |
| ☑ | 6003 | Availability | High availability to switch | Multiple | Warning | Enabled | No |
| ☑ | 6004 | Availability | High availability to switch card | Multiple | Warning | Enabled | No |
| ☐ | 6005 | Availability | High availability to switch ASIC | Multiple | Warning | Enabled | No |
| ☐ | 6006 | Availability | No redundant ports | Multiple | Warning | Enabled | No |

931

Apply To Rule Set    Cancel

METHODS AND APPARATUS ASSOCIATED WITH ADVISORY GENERATION

RELATED APPLICATIONS

This application is related to: i) co-pending United States patent application entitled "METHODS AND APPARATUS FOR MAPPING RESOURCES," Ser. No. 11/391,106, filed on Mar. 28, 2006, ii) co-pending United States patent application entitled "METHODS AND APPARATUS FOR RENDERING MESSAGES," Ser. No. 11/390,899, filed on Mar. 28, 2006, and iii) co-pending United States patent application entitled "METHODS AND APPARATUS ASSOCIATED WITH ADVISORY GENERATION," Ser. No. 11/391,012, filed on Mar. 28, 2006, the entire teachings of which are incorporated herein by this reference.

BACKGROUND

In general, a so-called storage area network (sometimes called a SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to utilize a set of interoperability rules to verify that a respective storage area network is configured properly. In general, the set of interoperability rules indicates which combination of different types of hardware and software resources are compatible with each other and can be used together in a respective storage area network. When rules are applied to a respective storage area network configuration, an administrator can identify storage area network resource incompatibilities.

SUMMARY

Conventional applications that support management of storage area network environments can suffer from a number of deficiencies. For example, as discussed above, management of a storage area network can be a challenge due to the complex network of resources that must be combined and configured so that the storage area network operates properly for a multitude of different types of users. Manual verification of a respective configuration by an administrator can be time-consuming as well as require paying close attention to details. In certain cases, if a respective administrator fails to properly identify that a set of one or more storage area network resources are incompatible, one or more clients in communication with a respective server may not be able to access data in the storage area network.

Automatic application of rules to test a respective storage area network configuration can be invaluable to a network administrator trying to identify configuration errors associated with a respective storage area network. Unfortunately, due to its inherent complexity as discussed above, a respective storage area network configuration can include so many errors that generation of advisory information associated with each rule failure is annoying to a respective network administrator. Moreover, an advisory message may indicate the presence of a configuration error that actually does not exist.

Techniques discussed herein deviate with respect to conventional applications such as those discussed above as well as other techniques known in the prior art. For example, embodiments herein enable a respective user (e.g., a network administrator) to customize application of a set of rules or a rule engine according to user-defined conditions for purposes of testing a respective storage area network configuration.

More specifically, one embodiment herein includes a rule engine and/or one or more related processes that utilize user-defined conditions to affect a display of messages associated with an applied set of storage area network configuration rules. For example, a rule engine process maintains a set of rules for purposes of validating a storage area network configuration. In one embodiment, the storage area network configuration includes many different types of resources to which the different rules are applied for validation purposes. A user can make a selection of a particular resource associated with the storage area network configuration and identify information such as which particular rules pertain to (e.g., are applied to test) the respective resources in the storage area network configuration.

In response to selection of the storage area network resource by a user, a display process initiates a display of one or more rule identifiers indicating corresponding rules that are typically applied to test the selected storage area network resource. In other words, in one embodiment, rule identifiers can indicate one or more rules that are associated with the selected resource or one or more rules that happened to fail during a previous application of the set of rules to the selected storage area network resource.

In addition to displaying rule identifiers (e.g., numerical values such as rule identifiers) that indicate which rules pertain to a selected resource, the display process also can initiate display of corresponding rule message information describing respective advisories such as rule failures. Accordingly, a respective user can select a respective resource in a storage area network configuration and thereafter identify which rules happen produced advisory message information during a previous application of the rules to the storage area network configuration.

The user viewing rule message information and/or rule identifiers can initiate display of a graphical user interface enabling the respective user to generate and manage application of so-called user-defined conditions associated with one or more rules for validating the storage area network configuration. In one embodiment, a respective user can select a rule identifier for purposes of generating the user-defined conditions. For example, in response to receiving a selection of a rule identifier, a rule engine process according to an embodiment herein can initiate display of a graphical user interface enabling the respective user to generate a user-defined condition associated with a given rule to prevent a future display of subsequently generated rule message information associated with the given rule.

In the context of the present example, the graphical user interface as discussed above can include a listing of rule identifiers and respective information indicating whether the rules have any specified user-defined conditions associated with each of them. To create or modify user-defined conditions for a given rule, the respective user can select one or more of the rules in the listing to initiate display of another graphical user interface that enables the user to specify conditions for applying the respective rule.

During a process of later applying a respective set of rules to validate a storage area network configuration, a rule engine process receives and utilizes the user-defined condition(s) pertaining to generation of respective rule message information associated with the given rule as specified by the respective user. In one embodiment, the rule engine process applies the user-defined condition to prevent generation of the respective rule message information associated with the given rule. Thus, via generation and use of user-defined conditions, a respective user can customize a respective set of rules and prevent generation of advisory information associated with storage area network configuration validation rules.

In view of the specific embodiment discussed above, more general embodiments herein are directed to a user programmable rule engine process that maintains a set of rules for purposes of validating a storage area network configuration. The rule engine process initially receives user-defined conditions pertaining to generation of respective rule message information associated with one or more rules in the maintained set of rules. During validation of a respective storage area network configuration, the rule engine process applies the user-defined conditions to affect or prevent generation of the respective rule message information associated with the one or more rules. Accordingly, a user such as a storage area network administrator can customize a respective rule engine (e.g., via user-defined conditions associated with the rules) and, based on a subsequent application of the set of rules to a storage area network configuration according to the user-defined conditions, limit generation of rule message information in the event that one or more respective rules happens to fail.

According to other embodiments, application of the set of rules produces rule message information including advisories such as error, warning, or informational messages that are generated in response to applying a respective rule and detecting a rule violation or conditions specified by the respective rule. As mentioned, the rule engine process herein can utilize the user-defined conditions to reduce or eliminate generation of advisory messages for display to a respective user. More specifically, the user-defined conditions can be used to prevent rules from being applied to validate resources in the storage area network configuration. As an alternative, the user-defined conditions can be used (by a respective rule engine) to prevent certain applied rules from producing advisory message data during rule processing even though application of a rule happens to trigger generation of respective advisory data. As another alternative, a display process can utilize the user-defined conditions to identify whether to produce and display advisories for rules that happen to produce advisory message data. Accordingly, use of the user-defined conditions can ensure that a respective user will not be inundated with unnecessary storage area network advisory messages that he or she does not care to view.

Techniques herein are well suited for use in applications such as management of resources and application of rules in respective storage area network environments. However, it should be noted that configurations herein are not limited to such use and thus configurations herein and deviations thereof are well suited for use in other types of environments that support application of rules.

In addition to the embodiments discussed above, other embodiments herein include a computerized device (e.g., a host computer, workstation, etc.) configured to support the techniques disclosed herein to manage validation rules associated with a respective storage area network environment. In such embodiments, the computerized device includes a memory system, a processor (e.g., a processing device), a respective display screen to display messages, and an interconnect system connecting the processor and the memory system. The interconnect system can also support communications with the respective display (e.g., display screen or display medium). The memory system is encoded with a rule engine application that, when executed on the processor, generates a process for applying a customized set of rules and/or a process for customizing how to apply a set of rules according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to maintain and apply rules according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for maintaining rules according to an embodiment herein. The instructions, when carried out by a processor of a respective computer device, cause the processor to perform the steps of: i) maintaining a set of rules for purposes of validating a storage area network configuration; ii) receiving a user-defined condition pertaining to generation of respective rule message information associated with at least one rule in the set of rules; and iii) applying the user-defined condition to prevent generation of the respective rule message information associated with the at least one rule. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 5 is a graphical user interface illustrating different types of resources in a respective storage area network environment that can be selected for a user-defined condition according to embodiments herein.

FIG. 7 is a graphical user interface illustrating different types of values that can be selected for a user-defined condition according to embodiments herein.

FIG. 9 is a graphical user interface enabling a respective user to copy conditions associated with a selected rule to one or more other rules according to embodiments herein.

DETAILED DESCRIPTION

According to one embodiment, a rule engine process maintains a set of rules for purposes of validating a storage area network configuration. The rule engine process (or other process such as a message rendering process) has access to user-defined conditions indicating whether to generate respective rule message information (e.g., advisories) when applying one or more rules in the maintained set of rules. That is, during validation of a respective storage area network configuration, a rule engine process can receive and apply or utilize user-defined conditions to identify circumstances in which to prevent and/or cause generation and/or display of advisories associated with one or more applied rules. Accordingly, a user such as a storage area network administrator can customize a respective rule engine (e.g., via the user-defined conditions associated with the rules) and, based on a subsequent application of the set of rules to a storage area network configuration according to the user-defined conditions, limit application of rules and generation of rule message information (e.g., advisories) in the event that one or more respective rules happens to fail.

Figure 1:
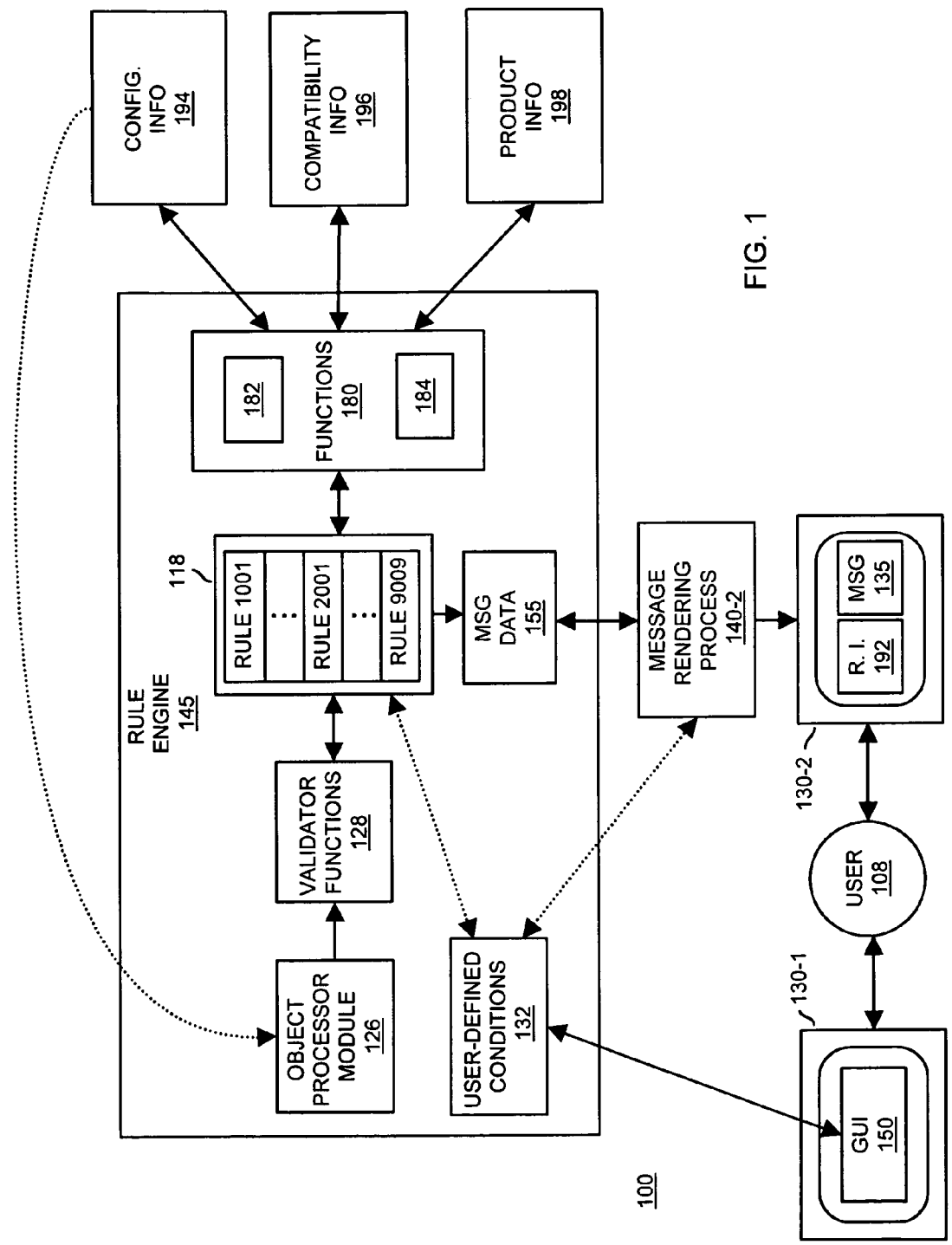
FIG. 1 is a diagram illustrating a rule engine and corresponding message rendering process for use in a storage area network environment according to an embodiment herein.

FIG. 1 is a diagram of storage area network environment 100 including a rule engine 145 for applying rule logic 118 (e.g., software code to carry out application of rules) according to embodiments herein. As shown, storage area network environment 100 includes rule engine 145, message rendering process 140-2, display screen 130 (e.g., display screen 130-1 and display screen 130-2), user 108, configuration information 194 (e.g., storage area network configuration information), compatibility information 196, and product information 198. Rule engine 145 includes an object processor module 126, validator functions 128, rule logic 118, message data 155, and functions 180. Functions 180 include data filter functions 182 and data collection functions 184.

Display screen 130-1 enables the user 108 to manage user-defined conditions associated with rule logic 118 (e.g., rules). Rule engine 145 and/or message rendering process 140-2 utilize the user-defined conditions 132 to identify restrictions associated with rule logic 118 such as under what circumstances a respective rule will generate and/or display advisory information for user 108. Display screen 130-2 enables a respective user 108 to view resource information 192 associated with selected resources of a storage area network configuration and view corresponding messages 135 (e.g., advisories) generated as a result of applying one or more rules to the resources identified by resource information 192.

Part I of the following discussion associated with FIG. 1 illustrates functionality associated with a rule engine and related processes that enable generation of advisory messages during a respective process of applying a set of rules to validate a respective storage area network configuration. As mentioned, a user can initiate viewing of the advisory messages that are generated as a result of respective rules failing during a validation process. Part II of the following discussion associated with FIG. 1 illustrates use of user-defined conditions 132 to control under what circumstances a respective rule (when applied to verify a storage area network configuration) will generate corresponding advisory message information.

Part I. General Functionality Associated with Rule Engine 145

In general, as discussed above, rule engine 145 of FIG. 1 validates a configuration associated with a system such as a respective storage area network via application of rules. Upon detecting a configuration error or that a respective storage area network configuration is sub-optimal based on application of rule logic 118, rule engine 145 generates message data 155. Message rendering process 140-2 can utilize the message data 155 (generated by rule logic 118) for purposes of generating messages 135 (e.g., advisory information) on display screen 130 for a respective user 108. Accordingly, a respective user 108 can be notified of a broad range of different types of information such as whether a configuration has fatal errors to whether a respective storage area network configuration is sub-optimal. As will be further discussed in Part II below, user-defined conditions 132 can affect generation and/or display of advisory information to the respective user 108.

In the context of one embodiment, the rule engine 145 initially receives an indication (from user 108 or other entity) of corresponding configuration information 194 associated with the respective storage area network to be validated or checked. The configuration information 194 can include a set of multiple managed objects, each of which includes specific information indicating a configuration associated with a respective resource in the storage area network under test. Resources (to be validated, verified, checked, tested, . . . ) can include elements in the storage area network such as host resources, switch resources, storage resources, etc. as more particularly shown and discussed in FIG. 14.

Referring again to FIG. 1, to validate a respective storage area network, the object processor module 126 of rule engine 145 retrieves each of multiple objects (e.g., resource configuration information) stored in configuration information 194 and applies rule logic 118 (e.g., instructions to carry out each of multiple different rules) to the configuration information 194 to determine whether the respective storage area network has been configured properly. A collection of multiple managed objects in the configuration information 194 can represent an overall configuration of the storage area network. Each managed object can include information indicating a configuration of one or more respective storage area network resources. Application of rule logic 118 produces different output data (e.g., message data 155) depending on which of one or more applied rules happens to fail.

In one embodiment, the object processor module 126 retrieves information from the configuration information 194 at least in part on object-by-object (e.g., resource-by-resource) processing. That is, the rule engine 145 can sequentially validate (e.g., based on a predetermined order) the objects in configuration information 194 one at a time and in combination to test an overall storage area network configuration. In certain cases, the rule engine 145 can retrieve multiple related managed objects for purposes of verifying a respective configuration associated with a storage area network resource. As mentioned, a retrieved object from configuration information 194 indicates configuration information associated with a respective resource in the storage area network. Application of a series of storage area network configuration tests can ensure verification of an overall storage area network.

In the context of the present example, assume that rule engine 145 initially utilizes object processor module 126 to identify type or attribute information associated with a given resource (e.g., a retrieved managed object) of multiple resources in a storage area network. After identifying a type and/or attributes associated with a given resource as specified by the configuration information 194, the rule engine 145 utilizes the learned type or attribute information associated with the given resource to select one of multiple respective validator functions 128 to execute and apply to a retrieved object for purposes of validating the given resource. In one embodiment, each of the validator functions 128 selected by the rule engine 145 specifies rule processing information such as which of multiple rules to apply to the identified type of resource, an order for applying the rules, conditions under which certain rules will be applied to the given resource, and so on.

In one embodiment, to verify a retrieved managed object, object processor module 126 forwards information (e.g., object information) associated with a resource under test to a selected one of the multiple validator functions 128. In turn, the selected validator function sends information such as the object (e.g., configuration information such as that found in a so-called ".SAN" file) associated with the resource under test to rule logic 118 that initiates testing of the resource or object information.

To carry out a respective rule specified by a selected validator function, the rule logic 118 executes functions 180 such as data filter functions 182 and data collection functions 184. Based on execution or calls to functions 180, the rule logic 118 is able to retrieve further information that is used for purposes of testing the resource under test. In certain cases, the rule logic 118 retrieves additional portions (e.g., other object information in a respective SAN file associated with the resource under test) of configuration information 194 to determine how the resource under test and/or other related resources are configured for purposes of carry out one or more rules as specified by the selected validator function.

In addition to potentially retrieving related configuration information 194 associated with a resource under test for testing purposes, the rule logic 118 can initiate execution of functions 180 to retrieve further information such as compatibility information 196 and product information 198 associated with the resource under test. For example, rules in the rule logic 118 can utilize the data collection function 182 and the filter function 184 enable rule logic 118 to access compatibility information 196 and thus identify whether a resource under test is compatible with other resources present in the storage area network environment 100.

Application of a respective rule may require more particular or additional knowledge of the resource under test that is not included in object information initially retrieved from the configuration information 194. The rules in the rule logic 118 can utilize the data collection function 182 and the filter function 184 to access additional configuration information 194, compatibility information 196, and/or product information 198 associated with the resource under test for purposes of carrying a respective rule using functions 180. Accordingly, one embodiment herein includes a rule engine 145 that identifies a set of information (e.g., information such as configuration information 194, compatibility information 196, and product information 198) required to carry out execution of a respective rule in rule logic 118. The rule engine 145 accesses the required set of information from one or more respective repositories to carry out execution of the respective rule.

As an example of rule engine 145 operation, assume that a resource under test has associated object information retrieved from configuration information 194 identifying a specific make and model of a switch device. Retrieved compatibility information 196 can indicate which types of switches work with which types of hosts and storage arrays in the storage area network. Following retrieval of the compatibility information 196, the rule logic 118 can apply one or more respective rules as specified by a selected validator function to identify whether the switch device is compatible with other types of resources in a particular storage area network configuration.

In one embodiment, application of a set of rules (e.g., one or more rules associated with a selected validator function) applied to a resource under test produces a range of different types of error and/or warning information. For example, application and failure of certain rules in rule logic 118 can result in generation of message data 155 (e.g., error and/or warning information).

Message rendering process 140-2 utilizes message data 155 to generate messages 135 for viewing by a respective user 108. Consequently, following application of rule logic 118 (e.g., a set of rules) to validate a respective storage area network configuration, a respective user 108 can be notified of events (e.g., via use of the error and/or warning information) such as whether a respective storage area network configuration is operable, which resources in a storage area network are incompatible, whether a respective storage area network configuration is configured for efficient operation, etc.

Part II. Creation and Use of User-Defined Conditions 132

The above process illustrates how rule engine 145 can generate message data 150 and how message rendering process 140-2 uses message data for purposes of displaying advisory information (e.g., messages 135) to a respective user 108. User-defined conditions 132 can alter processes such as those supported by rule engine 145 and/or message rendering process 140-2 and affect whether advisory messages (e.g., messages 135) are displayed on display screen 130 for viewing by a respective user 108. For example, via graphical user interface 150, a respective user 108 can create user-defined conditions 132 to prevent or cause a future display of advisory messages on display screen 130. A process such as rule engine 145 or message rendering process 140-2 can receive or retrieve user-defined conditions 132 affecting how rules are applied to test a respective storage area network configuration under test.

In one embodiment, the rule engine 145 applies rule logic 118 to verify a respective storage area network configuration. After application of rules, the rule engine 145 utilizes user-defined conditions 132 to determine whether or not to store message data 155 for rules that happen to fail during application of rule logic 118. For example, user-defined conditions 132 can indicate which rules of rule logic 118 are disabled from producing message data 155. Disabling storage message data 155 (e.g., advisory information or rule message information) for failing rules prevents message rendering process 140-2 from being able to create messages 135 (e.g., advisories) for user 108. Thus, the user-defined conditions can be used (by a respective rule engine 145) to prevent certain applied rules from producing advisory message data during rule processing even though application of one or more rules happens to attempt generation of respective advisory data for storage as message data 155.

In another embodiment, the rule engine 145 utilizes the user-defined conditions 132 to reduce or eliminate generation of advisory messages for display to a respective user by preventing application of certain rules to configuration information for purposes of validating a respective storage area network configuration. In other words, certain rules in rule logic 118 are not executed based on user-defined conditions 132.

In yet another embodiment, the rule engine 145 can apply rule logic 118 without regard to whether the user-defined conditions 132 place any restrictions on application of rule logic 118. Thus, rule logic 118 produces message data for any rules that happen to fail or trigger writing information during the rule application process. A display process such as message rendering process 140-2 can utilize the user-defined conditions to identify whether to produce and display advisories for rules that happen to produce advisory message data.

Accordingly, use of the user-defined conditions in any of the above embodiments can ensure that a respective user will not be inundated with unnecessary storage area network advisory messages that the user 108 does not care to view on display screen 130-2 during a review process.

Generation, maintenance, and general use of user-defined conditions 132 will now be discussed with respect to graphical user interface 150 more particularly shown in FIGS. 2-9 below. In general, the following discussion discloses a technique in which a user selects a resource associated with the storage area network configuration; views a display screen displaying rule message information (including a rule identifier of a respective rule) associated with the selected resource that produced an advisory message associated with the selected resource; selects the rule identifier associated with the rule message information (e.g., advisory); and generates a user-defined condition for the rule identifier to prevent a future display of the rule message information on the display screen during a subsequent application of the set of rules (including the rule identified by the rule identifier) to a storage area network configuration.

Figure 2:
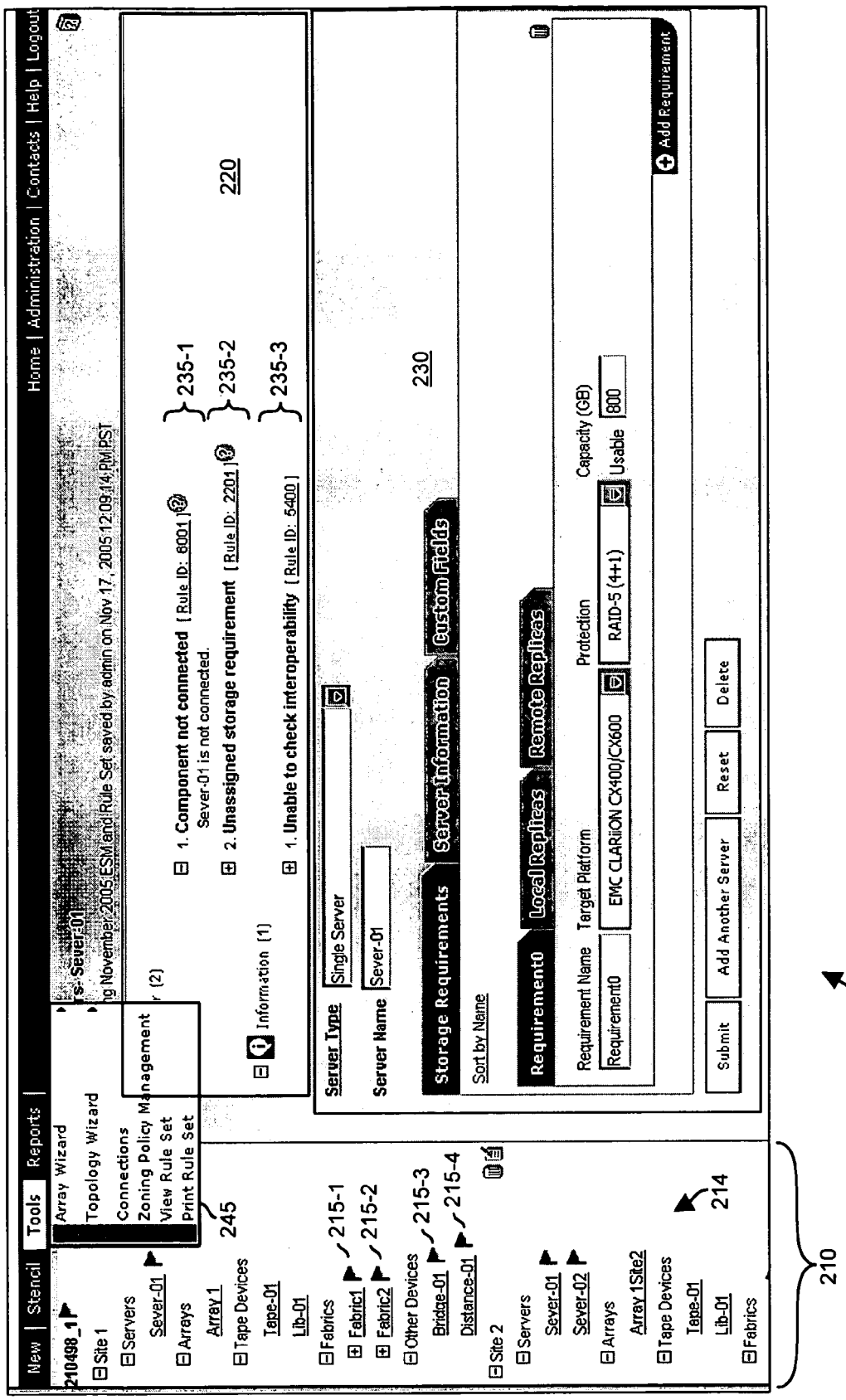
FIG. 2 is a graphical user interface for selecting storage area network resources and viewing corresponding rule information according to embodiments herein.

FIG. 2 illustrates a view of graphical user interface 150-1 for selecting storage area network resources and viewing corresponding rule information according to embodiments herein. As shown, graphical user interface 150-1 includes 3 different display regions for displaying information to a user 108. For example, display region 210 of graphical user interface 150-1 displays a hierarchical tree 214 of storage area network resources. Display region 220 of graphical user interface 150-1 includes advisory information (e.g., rule message information) associated with a respective storage area network resource selected from hierarchical tree 214. Display region 230 of graphical user interface 150-1 includes features enabling a respective user 108 to view more specific information associated with the selected storage area network resource from hierarchical tree 214.

Resources displayed in hierarchical tree 214 can include devices such as servers, storage arrays, fabrics, etc. associated with respective sites (e.g., site 1, site 2, . . . ) of a storage area network configuration. The user 108 can expand entries in the hierarchical tree 214 by clicking on "+" symbols (e.g., expand functions) and "–" symbols (e.g., minimize functions).

Flags 215 indicate which of storage area network resources happen to produce advisory information as a result of applying respective rules associated with rule logic 118 discussed in FIG. 1. For example, flag 215-1 indicates that Fabric1 in Site1 of storage area network 210498_1 produced a respective advisory during a previous application of rules (e.g., rule logic 118 in FIG. 1) to verify the respective storage area network configuration. Flag 215-2 indicates that application of rules to Fabric2 produced an associated set of one or more advisories for viewing by user 108. Flag 215-3 indicates that application of rules to storage area network resource Bridge-01 produced an associated set of one or more advisories for viewing by user 108. Flag 215-4 indicates that application of rules to storage area network resource Distance-01 produced an associated set of one or more advisories for viewing by user 108, and so on.

In one embodiment, each of flags 215 is color coded to indicate different types of storage area network configuration messages. For example, a red flag may indicate a fatal error associated with a respective storage area network resource, which prevents proper operation of a storage area network configuration. A yellow flag may indicate that, although a storage area network configuration is acceptable, the respective storage area network configuration is not optimal, and so on.

In the context of the present example, display region 220 in graphical user interface 150-1 illustrates advisory messages 235 generated as a result of applying rule logic 118 to test storage area network resource Server-01. Advisory message 235-1 indicates an error associated with rule 6001 and that selected Server-01 from site 1 of hierarchical tree 214 is not connected a storage array. Advisory message 235-2 indicates occurrence of an error associated with rule 2201 (e.g., an unassigned storage requirement). Advisory message 235-3 is an example of an informational message associated with rule 5400 indicating an inability to check interoperability associated with Server-01.

Advisory messages 235 in display region 220 can be expanded via use of respective "+" symbols (e.g., expand functions) to view more details associated with a respective message and "–" symbols (e.g., minimize functions) to eliminate detailed message information from being displayed in display region 220.

Display region 230 enables a respective user 108 to modify configuration information associated with the selected storage area network resource (e.g., Server-01).

As previously discussed, the user 108 may wish to prevent a future display of certain types of advisory messages 235 appearing in display region 220 of graphical user interface 150-1. For example, the user 108 may wish to modify user-defined conditions 132 associated with one or more rules (e.g., rule logic 118) to prevent a display of future advisory messages 235 in display region 220.

Figure 3:
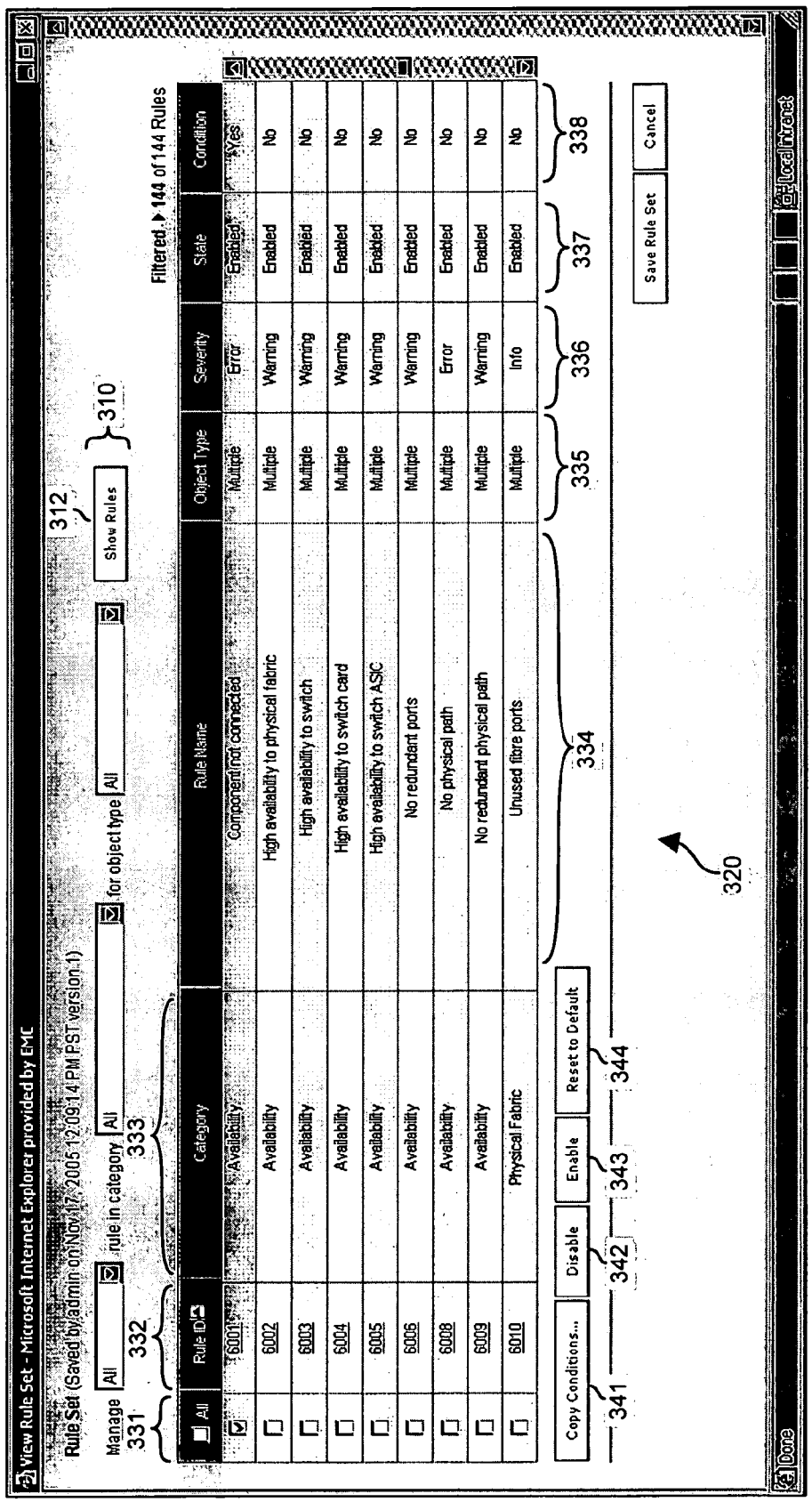
FIG. 3 is a graphical user interface illustrating a listing of a set of rules and corresponding information indicating whether user-defined conditions have been created for each rule in the set of rules according to embodiments herein.

To view a respective rule set and corresponding information indicating whether a respective user has initiated application of any user-defined conditions for any of the rules (as shown in FIG. 3), the user 108 can click on entry "View Rule Set" in pull-down menu 245 of graphical user interface 150-1. Alternatively, the user 108 can select (e.g., click on) the numerical value of a respective rule ID in one of advisory messages 235 to view a respective rule set and corresponding information. In response to either of the above user inputs, a respective display process associated with display screen 130 produces the graphical user interface 150-2 in FIG. 3.

FIG. 3 is a graphical user interface 150-2 illustrating a listing (e.g., table 320) of an unfiltered set of rules (listed by numerical values assigned to the rules) and corresponding information indicating whether user-defined conditions have been created for each rule in the set of rules according to embodiments herein. As shown, to reduce a number of rules listed in table 320, graphical user interface 150-2 includes filter function 310 enabling a respective user 108 to filter which rules are displayed in table 320. In the context of the present example, filter function 310 includes a number of pull-down menus enabling a respective user 108 to filter by category and object type. Selection of symbol 312 (e.g., "Show Rules") activates filter function 310 to modify which rules appear in table 320.

Table 320 includes columns of information enabling user input and display of information. For example, column 331 enables a respective user 108 to select (e.g., via toggling of corresponding checkboxes ON and OFF) one or more rules in which to apply different functions such as those represented by symbol 341 (e.g., a copy function), symbol 342 (e.g., a disable function), symbol 343 (an enable function), and symbol 344 (a reset condition to default function).

Figure 4:
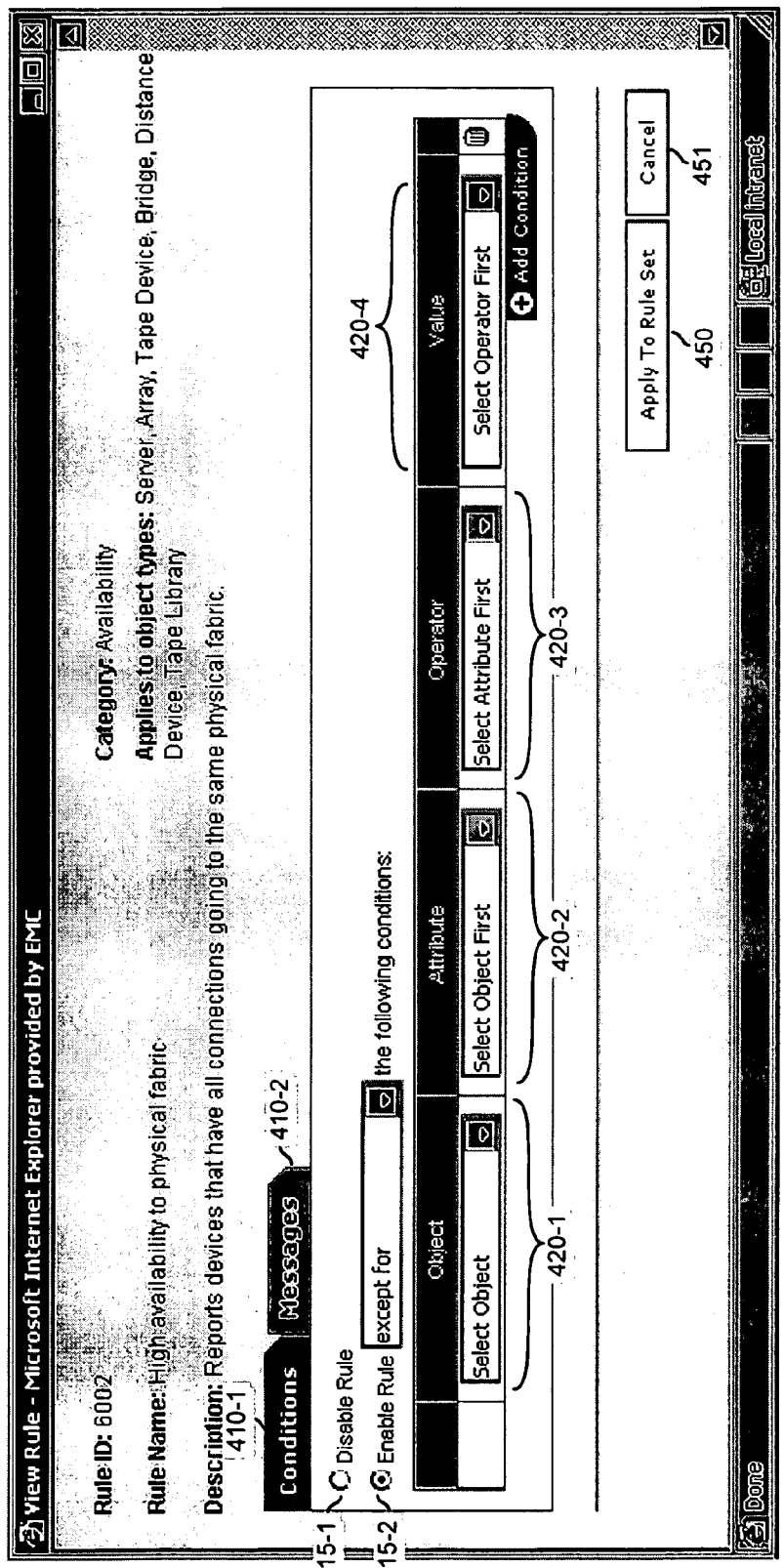
FIG. 4 is a graphical user interface enabling a respective user to enable and disable user-defined conditions associated with a respective rule according to embodiments herein.

Column 332 identifies each entry (e.g., rows) in table 320 via a respective numerical value rule identifier such as rule 6001, 6002, etc. Selection of a respective rule identifier value initiates display of graphical user interface 150-3 as shown in FIG. 4.

Column 333 of FIG. 3 indicates a respective type of rule category associated with each of the respective rules in column 332. For example, rules 6001, 6002, 6003, 6004, 6005, 6006, 6008, and 6009 are categorized under "availability." Rule 6010 is categorized under Physical Fabric, and so on.

Column 334 provides a brief description name associated with a respective rule.

Column 335 includes information indicating a respective object type associated with each of rules in column 332.

Column 336 indicates a respective severity of advisories associated with a respective rule in column 332.

Column 337 indicates a respective state associated with a rule such as whether a respective rule is enabled or disabled during a respective application of rules to test a storage area network configuration.

Column 338 provides an indication whether or not any user-defined conditions 132 have been established for each respective rule in table 320.

After selection of checkboxes in column 331, a respective user 108 can enable and disable user-defined conditions 132 associated with a respective rule by appropriately selecting symbol 342 and symbol 343. To reset user-defined conditions 132 for a respective rule checked in column 331 back to a default setting, the user 108 can click on symbol 344.

According to one embodiment, to modify user-defined conditions 132 created for a respective rule in table 320, the user 108 can select (e.g., click on) a particular rule (e.g., rule 6002) and initiate display of graphical user interface 150-3 in FIG. 4.

FIG. 4 is a graphical user interface 150-3 enabling a respective user 108 to enable and disable user-defined conditions associated with a respective rule according to embodiments herein. For example, as shown, graphical user interface 150-3 displays information associated with a selected rule (e.g., rule 6002) such as a rule identifier value, a name associated with a respective rule, a category to which the rule belongs, a listing of which types of objects the rule applies, and description of the rule for viewing by user 108. After creation of respective user-defined conditions 132 for a rule, the user 108 selects (e.g., clicks) on display region 450 to associate and apply a respective user-defined conditions (e.g., newly created or modified user-defined conditions) to a respective rule for a subsequent application of the rules to test a storage area network configuration.

Tabs 410 enable the user 108 to view different types of information associated with a selected rule. For example, selection of tab 410-1 (e.g., labeled "conditions") enables the user to prepare user-defined conditions 132 associated with rule 6002.

Figure 8:
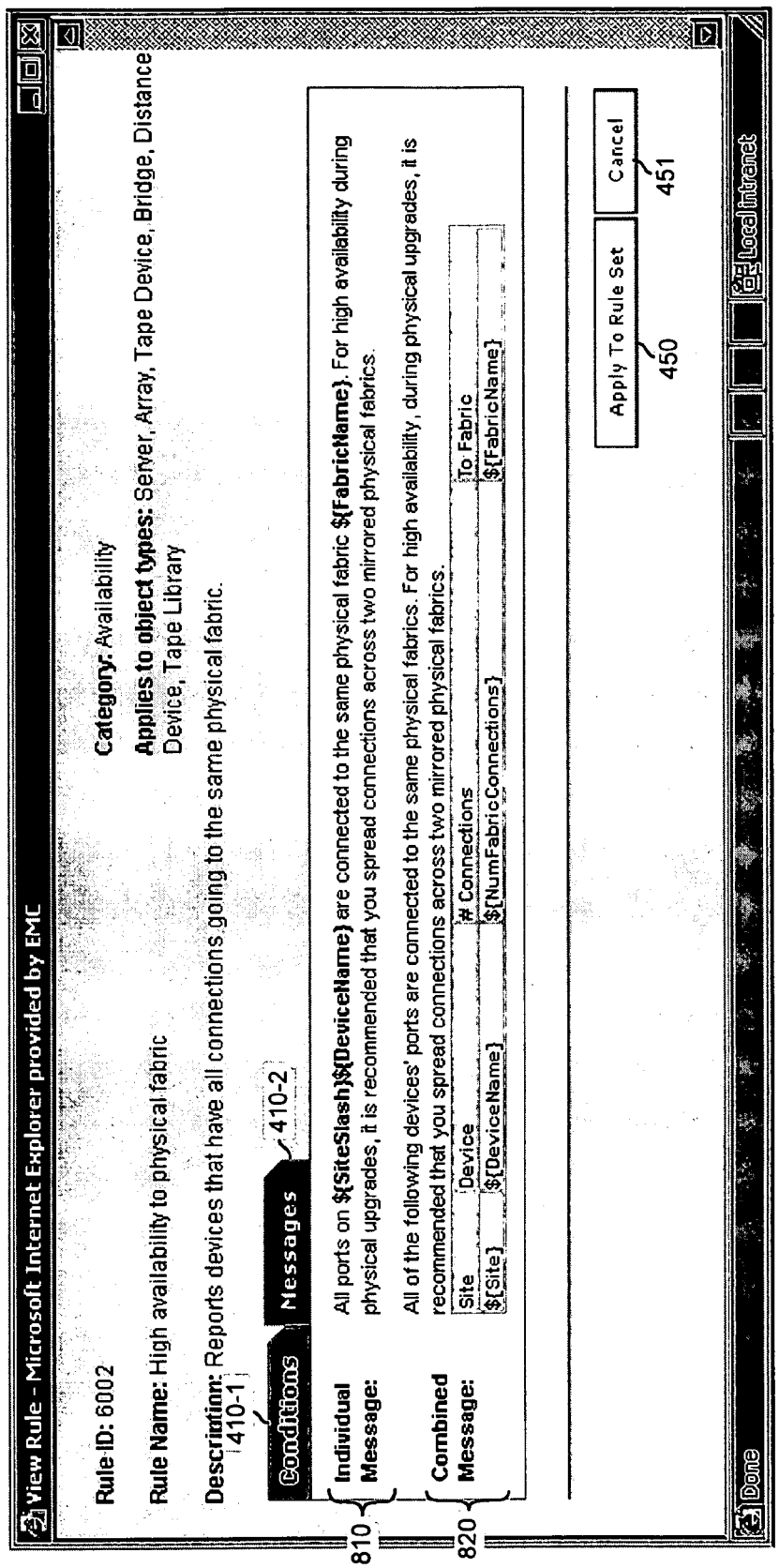
FIG. 8 is a graphical user interface illustrating details associated with a message structure for producing messages upon failure of a corresponding rule according to embodiments herein.

Selection of tab 410-2 enables the user 108 to view types of advisory information generated as a result of failure of a respective rule. For example, FIG. 8 is a graphical user interface 150-7 illustrating a rule identifier, rule name, category associated with rule, an indication of which object types a rule applies, and a description of the rule. Additionally, selection of tab 410-2 enables a user to at least view a format type associated with individual message information (e.g., in display region 810) typically generated in response to a single failure associated with rule 6002 as well as a format type associated with combined message information (e.g., in display region 820) typically generated in response to multiple failures associated with rule 6002. Accordingly, a respective user 108 can initiate display of data used for generating respective rule message information associated with a selected rule so that the respective user can at least partially identify a respective type of rule message information that will be prevented from being displayed to the respective user as a result of applying a user-defined condition 132 during a subsequent application of the set of rules to a storage area network configuration.

Referring again to the "conditions" screen in graphical user interface 150-3 of FIG. 4, selection of (e.g., clicking on) display region 415-1 in the "conditions" screen enables a respective user 108 to disable rule 6002 altogether and prevent corresponding rule advisories associated with rule 6002 from being generated or being displayed on display screen 130-1 on a subsequent application of rules to test a storage area network configuration.

Upon selection of display region 415-2 in the "conditions" screen, the respective user 108 can provide conditions (e.g., user-defined conditions) indicating when to apply respective rule 6002 to a storage area network configuration under test and generate corresponding advisory information associated with rule 6002. For example, the user 108 can provide object, attribute, operator, and value information to indicate conditions when to apply or not to apply rule 6002 for purposes of generating or not generating advisory messages.

In the context of the present example, display field 420-1 (e.g., a pull-down menu) enables the user 108 to select and limit an object type in which to apply rule 6002. Examples of different object types are shown in graphical user interface 150-4 of FIG. 5. However, note that display field 520-1 of graphical user interface 150-4 illustrates an example of selectable objects associated with rule 5001. As shown, the overall user-defined condition in graphical user interface 150-4 is directed to limiting application of rule 5001 to any object (e.g., resource such as a switch, host bus adapter, host, storage array, tape device, etc.) whose name starts with test.

Referring again to FIG. 4, display field 420-2 (e.g., a pull-down menu) enables the user 108 to select an attribute (e.g., model, name, etc.) associated with the object type for which to apply rule 6002.

Display field 420-3 (e.g., a pull-down menu) in graphical user interface 150-3 of FIG. 4 enables the user 108 to select an operator type for which to apply rule 6002. An example of different selectable operators is shown in graphical user interface 150-5 of FIG. 6. However, note that display field 620-3 in graphical user interface 150-5 illustrates an example of selectable operators associated with rule 2107.

Figure 6:
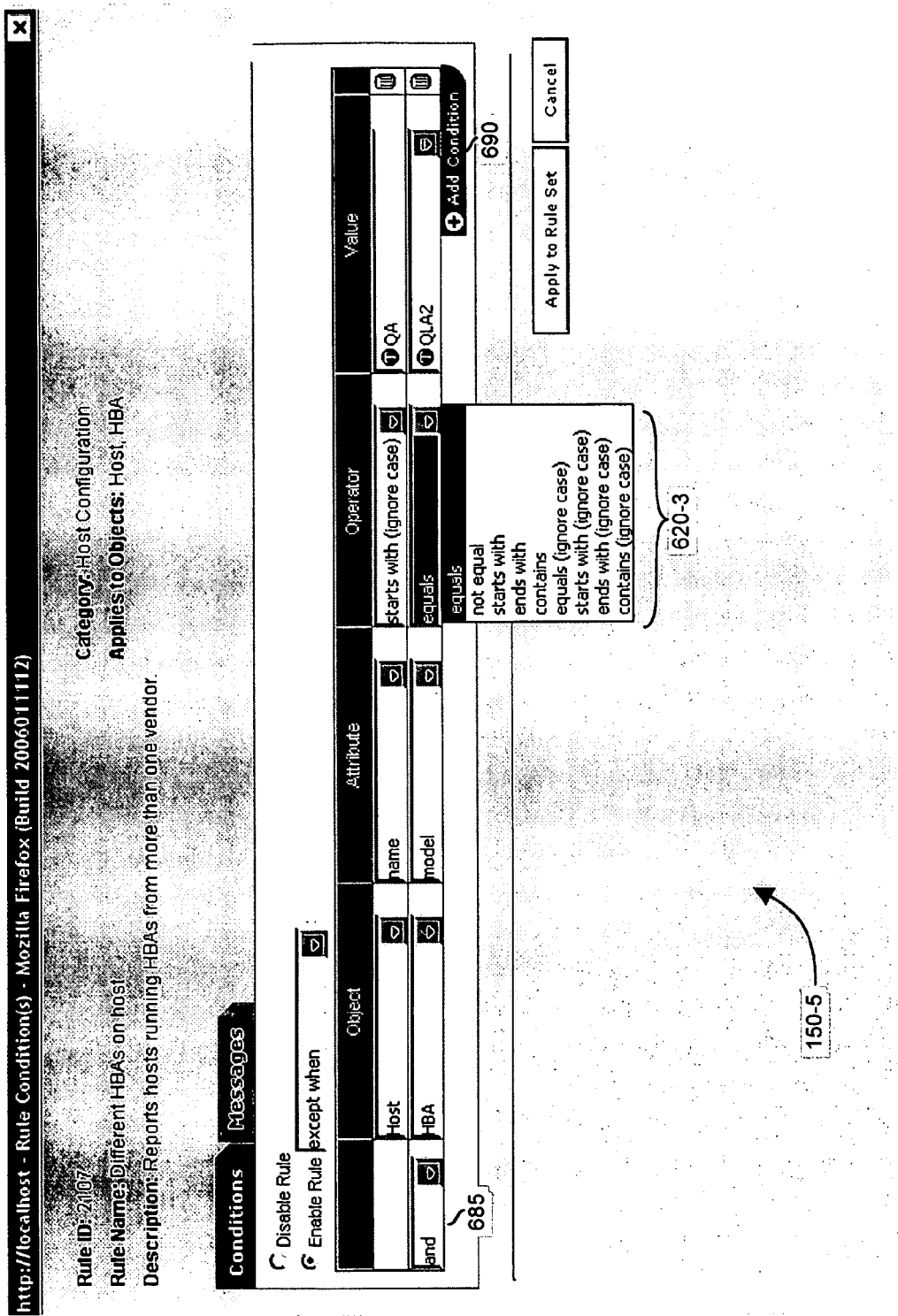
FIG. 6 is a graphical user interface illustrating different types of operators that can be selected for a user-defined condition according to embodiments herein.

The user-defined conditions in graphical user interface 150-5 of FIG. 6 indicate a multi-level condition associated with rule 2107. For example, the user-defined condition associated with rule 2107 indicate to enable rule 2107 except when i) a host name of a resource under test starts with QA and ii) a host bus adapter associated with the resource under test equals QLA2.

Display region 685 in graphical user interface 150-5 of FIG. 6 enables the user to select other Boolean logic operators such as OR, NOR, XOR (e.g., exclusive OR) type of functions via a pull-down menu to create user-defined conditions.

Display region 690 enables the user 108 to add conditions (e.g., another row for selection of object, attribute, operator, or value) connected by a respective Boolean operator value. Accordingly, graphical user interface 150-5 enables a user 108 to create a broad range of user-defined conditions.

Referring again to FIG. 4, display field 420-4 (e.g., a pull-down menu) enables the user 108 to select a value for which to apply rule 6002. The value in display region 420-4 depends on a selection under "attribute" (e.g., display region 420-2). In other words, the selection of a particular attribute type in display region 420-2 provides an indication of the respective type of information to display in display region 420-4. For example, if a user 108 selects names in display region 420-2, then display region 420-4 is populated with appropriate name information associated with object types selected in display region 420-1.

Figure 7:
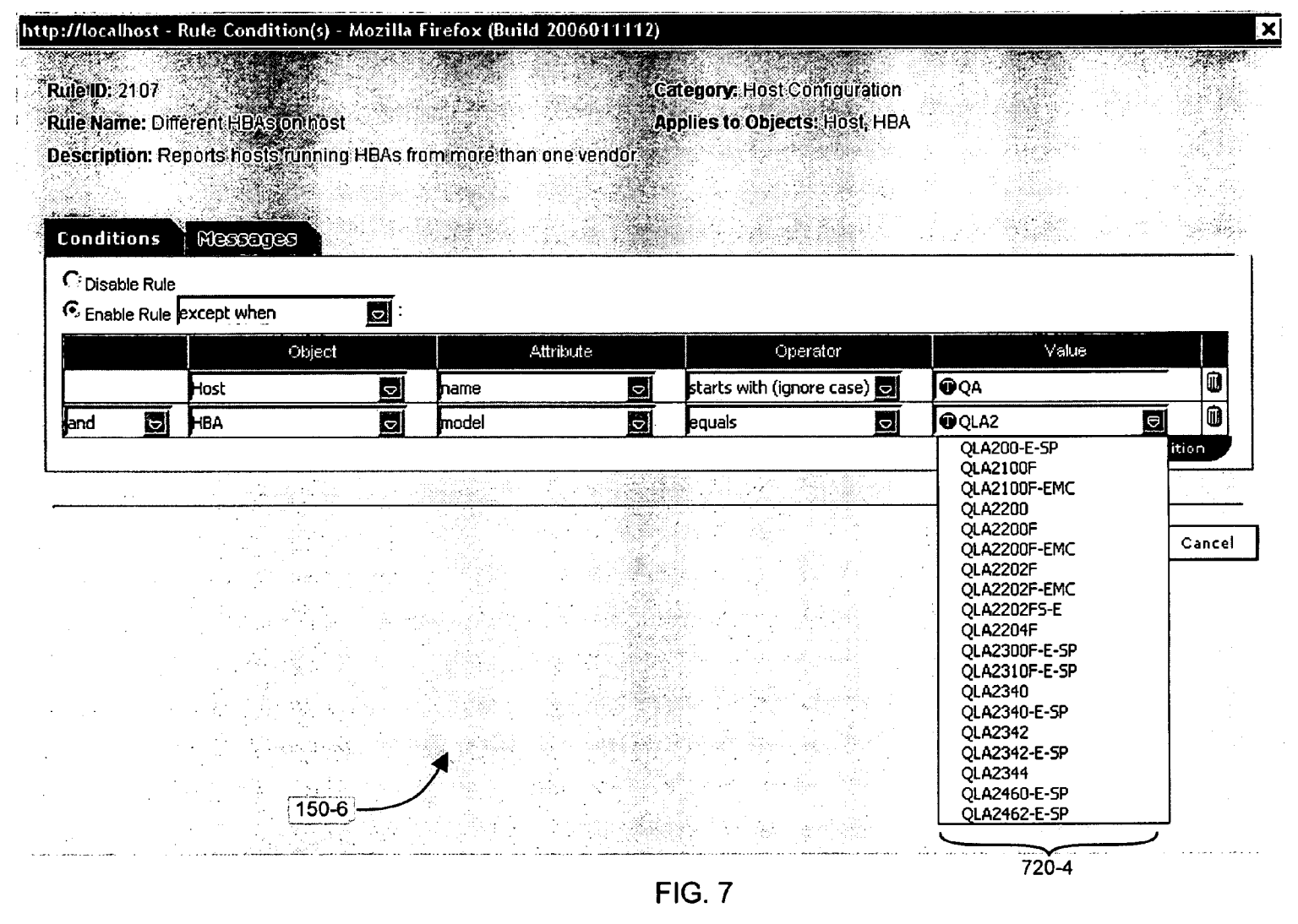

Examples of different values for displaying in display region 420-4 are shown in graphical user interface 150-6 of FIG. 7. However, note that display field 720-4 of graphical user interface 150-6 illustrates an example of selectable values associated with rule 2107. As shown, the overall user-defined condition in graphical user interface 150-6 indicates to apply rule 2107 to hosts and host bus adapters (e.g., see "applies to objects" information) except when i) a host name of a resource under test starts with QA and ii) a host bus adapter associated with the resource under test equals QLA2. The values in display region 720-4 correspond to a possible "model" value of an host bus adapter as indicated in the "attribute" and "object" columns of graphical user interface 150-6.

Referring again to FIG. 3, recall that user 108 can select one or more rules from table 320 by clicking on boxes in column 331. As shown, the user 108 has selected rule 6001, which happens to have corresponding user-defined conditions as indicated by the corresponding entry in column 338. After selection of one or more rules, the user can select (e.g., click on) display region 341 via a user-controlled pointer to initiate a copy command according to embodiments herein. For example, selection of display region 341 initiates a display of the graphical user interface 150-8 in FIG. 9.

FIG. 9 is a graphical user interface 150-8 enabling a respective user 108 to copy user-defined conditions associated with a selected one or more rule (e.g., rule 6002 from FIG. 3 in this example) to one or more other rules according to embodiments herein. As shown, graphical user interface 150-8 includes an indication of the selected rule (e.g., rule identifier 6001), the rule name, and conditions associated with the selected rule. In the present example, graphical user interface 150-8 indicates that rule 6001 applies when user defined group name equals test or when bridge user defined group starts with test or when distance device custom field name contains name.

The user 108 selects boxes in column 931 to identify which rules to copy the user-defined conditions associated with rule 6001. For example, the user 108 may choose to select rules 6003 and 6004 by selecting appropriate boxes in column 931. A checkmark appears in the appropriate boxes associated with rule 6003 and 6004 after a selection by user 108. After completion of a selection of one or more rules, the user 108 completes a (user-defined condition) copy function by selecting display region 960. This results in copying of user-defined conditions associated with rule 6001 to selected rules (e.g., rule 6003 and rule 6004) as identified in column 931. Accordingly, a respective user 108 can use the copy function described herein to easily create user-defined conditions associated with rules.

Accordingly, techniques herein include i) initiating display of a graphical user interface 150 including a first listing of at least a portion of a set of rules and corresponding information indicating whether respective user-defined conditions exist or apply to any rule in the portion of the set of rules displayed in the first listing; ii) receiving a command from a respective user viewing the first listing to initiate a copy function associated with a selected rule in the first listing; and iii) in response to receiving the command, initiating display of a graphical user interface enabling the respective user to copy a set of conditions associated with the selected rule from the first listing to one or more rules displayed in a second listing such that a set of conditions (e.g., user-defined conditions) associated with the selected rule from the first listing is copied to each of the one or more rule selected in the second listing.

Figure 10:
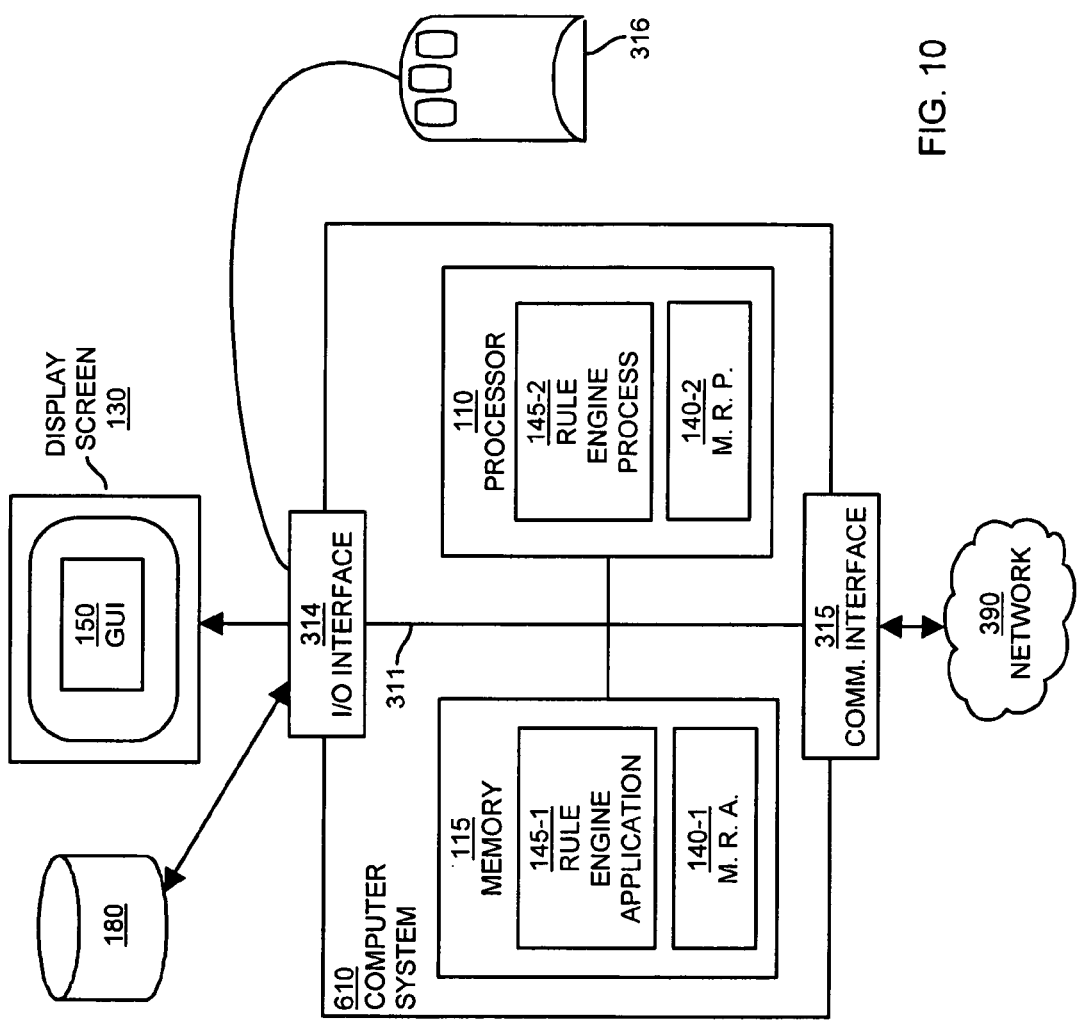
FIG. 10 is a diagram of an example platform for utilizing user-defined conditions according to embodiments herein.

FIG. 10 is a block diagram illustrating an example computer system 610 (e.g., a storage area network management control center) for executing a rule engine 145 and other related processes (e.g., message rendering process 140-2) according to embodiments herein. As previously discussed, the rule engine 145 and/or message rendering process 140-2 can use the user-defined conditions for purposes of applying rules to a storage area network configuration under test. In one embodiment, computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314 and enable user 108 to move a cursor or pointer about display screen 130 and make selections. I/O interface 314 also enables computer system 610 to access repository 180 to retrieve information such as configuration information 194, compatibility information 196, and product information 198, apply rule logic 118 and produce message data 155 for potentially displaying messages 135 on display screen 130. Communications interface 315 enables computer system 610 to communicate over network 390 to transmit and receive information from different remote locations.

In one embodiment, computer system 610 can initiate the display of configuration information (e.g., in the form of a hierarchical tree 214 as in FIG. 2) on corresponding one or more display screens for viewing by one or more respective network administrators (e.g., user 108) that manage (e.g., validate) and view configuration associated with storage area network environment 100 (FIG. 1).

As shown, memory system 115 is encoded with rule engine application 145-1 and/or message rendering application 140-1 that supports storage area network resource validation according to embodiments herein. Rule engine application 145-1 and/or message rendering application 140-1 can be embodied as software code such as data and/or logic instructions (e.g., code stored in memory 115 or on another computer readable medium such as a disk) that, when executed, support functionality according to different embodiments described herein.

During operation, processor 110 accesses memory system 115 via the interconnect 311 in order to launch, run, execute, interpret or otherwise perform the logic instructions associated with rule engine application 145-1. Execution of rule engine application 145-1 produces processing functionality in rule engine process 145-2. In other words, the rule engine process 145-2 represents one or more portions of the rule engine application 145-1 (or the entire application) performing within or upon the processor 110 in the computer system 610. Similarly, execution of message rendering application 140-1 produces processing functionality in message rendering process 140-2.

It should be noted that the rule engine 145 (as in FIG. 1) can be represented by either one or both of the rule engine application 145-1 and/or the rule engine process 145-2. For purposes of this discussion and different embodiments herein, general reference will again be made to the rule engine 145 as performing or supporting the various steps and functional operations as previously discussed and as will be discussed further in this specification.

It should be noted that, in addition to the rule engine 145, embodiments herein include the rule engine application 145-1 itself (i.e., the un-executed or non-performing logic instructions and/or data). The rule engine application 145-1 can be stored on a computer readable medium such as a floppy disk, hard disk, or optical medium. The rule engine application 145-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of rule engine application 145-1 in processor 110 as the rule engine process 145-2. Thus, those skilled in the art will understand that the computer system 610 may include other processes and/or software and hardware components, such as an operating system that controls allocation and use of hardware resources.

Functionality supported by computer system 610 such as a management control center executing rule engine process 145-2 and/or message rendering process 140-2 will now be discussed with respect to flowcharts in FIGS. 11-13. For purposes of this discussion, computer system 610 and, more particularly, a process (e.g., rule engine application 145-1, rule engine process 145-2, message rendering process 140-2, etc.) can perform steps in the flowcharts at run-time. This functionality can be extended to the other entities as well. Note that the steps in the below flowcharts need not always be executed in the order shown.

Figure 11:
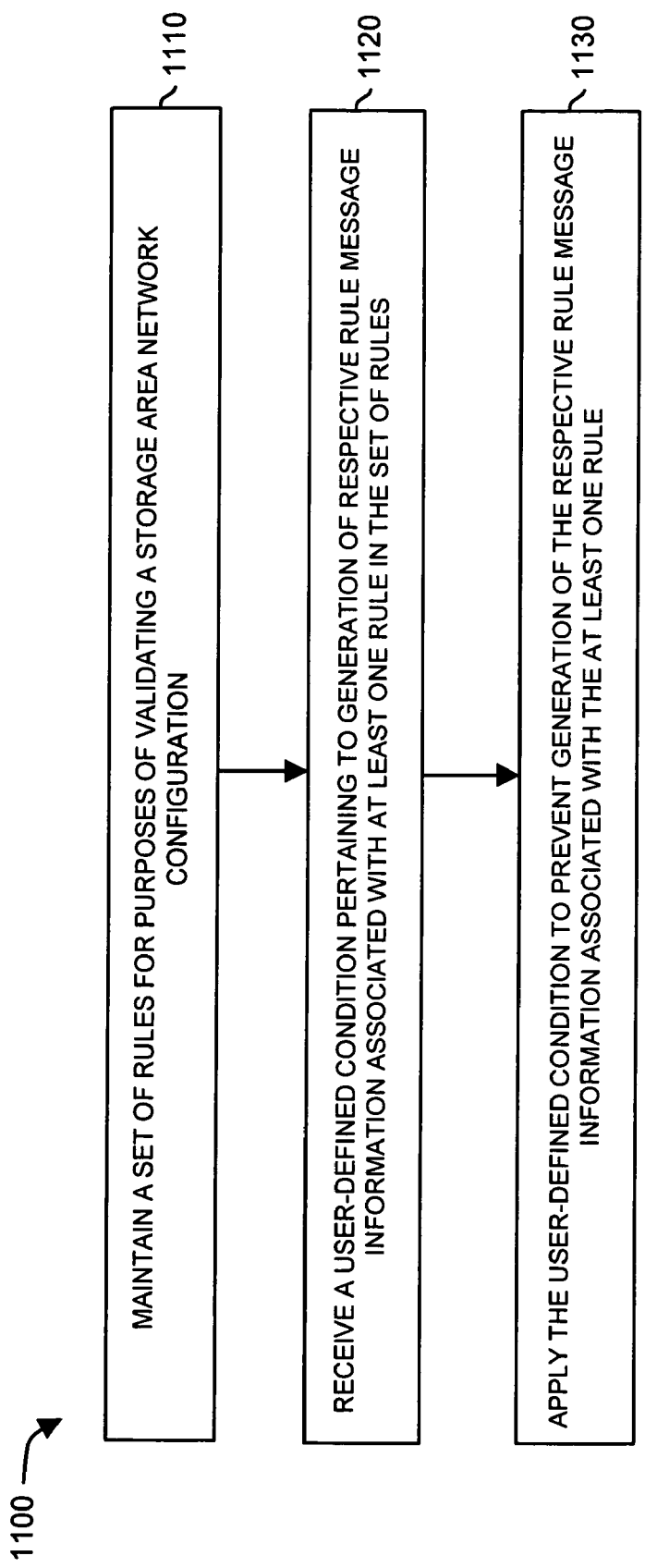
FIG. 11 is a flowchart illustrating use of user-defined conditions according to embodiments herein.

Now, more particularly, FIG. 11 is a flowchart 1100 illustrating a technique associated with rule engine 145 according to an embodiment herein. Note that techniques discussed in flowchart 1100 overlap with and summarize the techniques discussed above.

In step 1110, the rule engine 145 maintains a set of rules for purposes of validating a storage area network configuration under test.

In step 1120, the rule engine 145 (or other process such as message rendering process 140-2) receives a user-defined condition 132 pertaining to generation of respective rule message information associated with at least one rule in the set of rules.

In step 1130, the rule engine 145 (or other process such as message rendering process 140-2) applies the user-defined condition 132 to prevent generation of the respective rule message information associated with the at least one rule.

Figure 12:
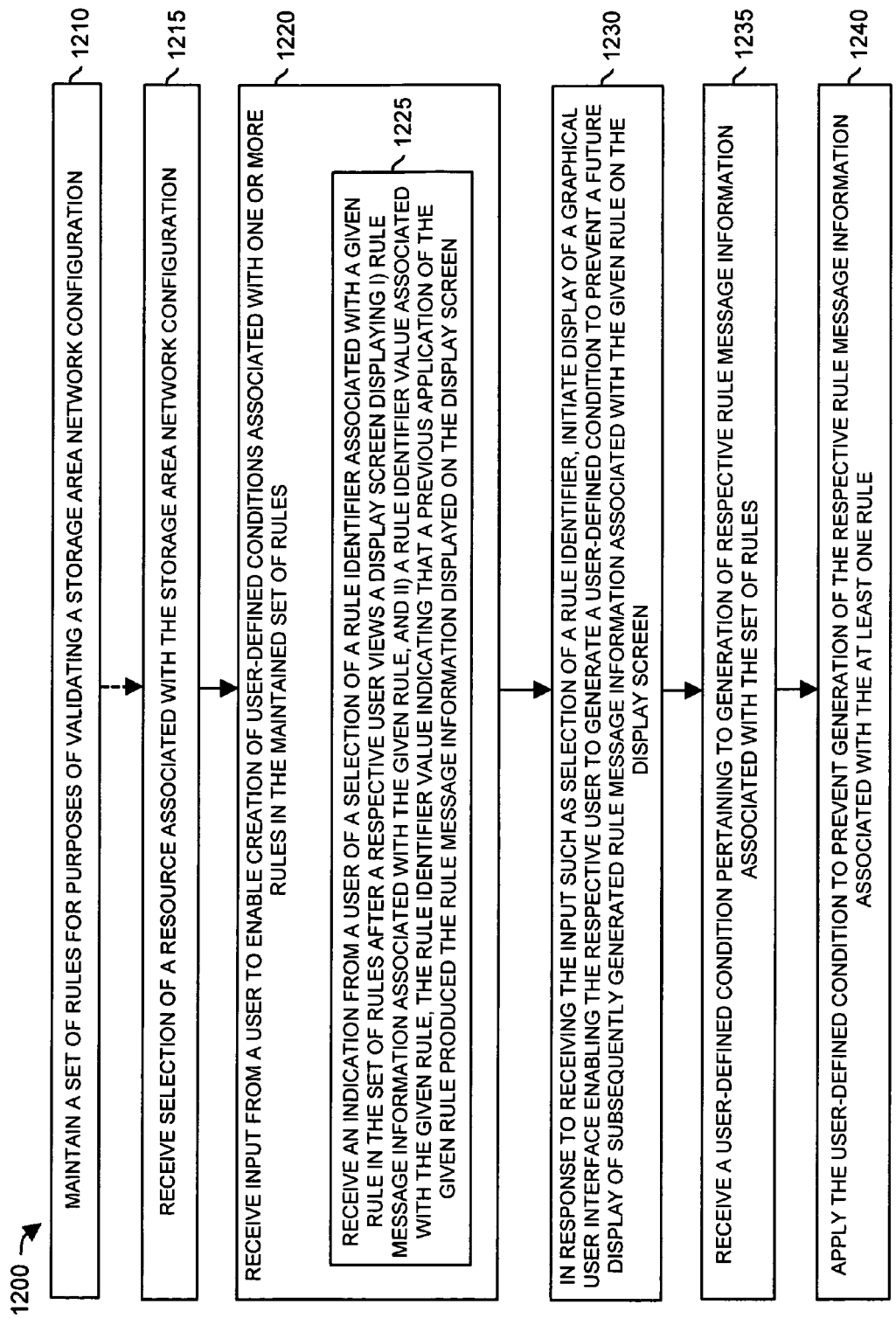
FIG. 12 is a flowchart illustrating use of user-defined conditions according to embodiments herein.

FIG. 12 is a flowchart 1200 illustrating processing steps associated with rule engine process 145 (or other process) according to an embodiment herein. Note that techniques discussed in flowchart 1200 overlap to some extent with the techniques discussed above in the previous figures.

In step 1210, the rule engine 145 maintains a set of rules (e.g., rule logic 118) for purposes of validating a storage area network configuration.

In step 1215, the rule engine 145 receives selection of a resource associated with the storage area network configuration to be tested or verified.

In step 1220, the rule engine 145 receives input from a user 108 to enable creation of user-defined conditions 132 associated with one or more rules in a maintained set of rules.

In step 1225, the rule engine 145 receives an indication from a user 108 of a selection of a rule identifier associated with a given rule in the set of rules after a respective user views a display screen 130 displaying i) rule message information associated with the given rule, and ii) a rule identifier value associated with the given rule, the rule identifier value indicating that a previous application of the given rule produced the rule message information displayed on the display screen. In other words, a respective user views information on display screen 130 indicating that a respective rule failed or produced an advisory on a previous application of rules to test a storage area network configuration.

In step 1230, in response to receiving input such as selection of a rule identifier, the rule engine 145 initiates display of a graphical user interface 150 enabling the respective user to generate a user-defined condition 132 to prevent a future display of subsequently generated rule message information associated with the given rule on the display screen 130.

In step 1235, the rule engine 145 receives and utilizes user-defined condition 132 pertaining to generation of respective rule message information associated with the set of rules.

In step 1240, the rule engine 145 applies the user-defined condition 132 to prevent generation of the respective rule message information associated with the at least one rule. Accordingly, a respective user 108 has control over which rules can produce advisory messages for viewing on a respective display screen 130.

Figure 13:
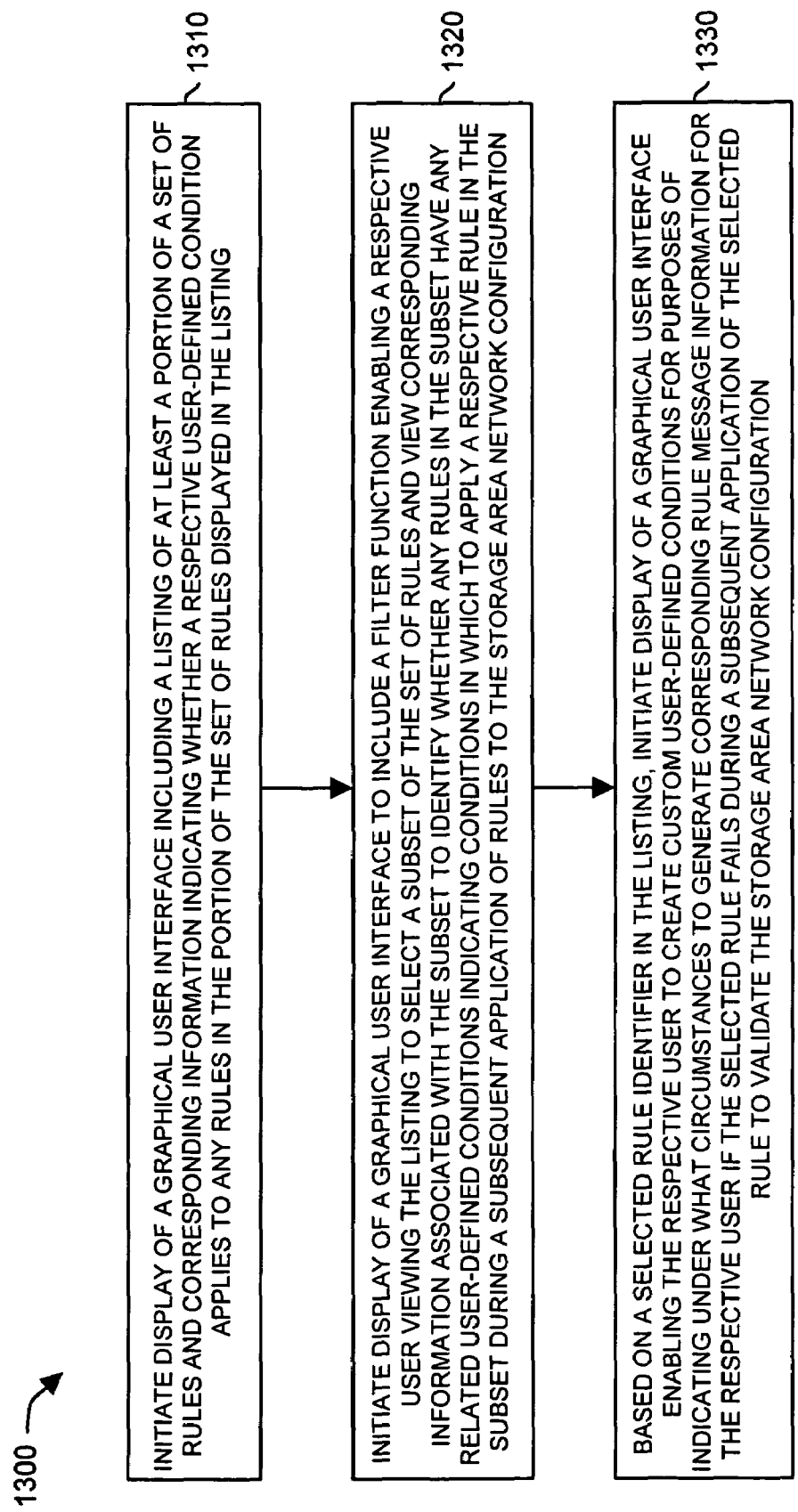
FIG. 13 is a flowchart illustrating use of user-defined conditions according to embodiments herein.

FIG. 13 is a flowchart 1300 illustrating processing steps associated with rule engine process 145 (or other process) according to an embodiment herein. Note that techniques discussed in flowchart 1300 overlap to some extent with the techniques discussed above in the previous figures.

In step 1310, a display function initiates display of a graphical user interface including a listing of at least a portion of a set of rules (e.g., rule logic 118) and corresponding information indicating whether a respective user-defined condition 132 has been created or applies to any rules in the portion of the set of rules displayed in a listing such as shown in table 320 in FIG. 3.

In step 1320, the display function initiates display of a graphical user interface 150 to include a filter function 310 enabling a respective user viewing the listing to select a subset of the set of rules and view corresponding information associated with the subset to identify whether any rules in the subset have any related user-defined conditions 132 indicating conditions in which to apply a respective rule in the subset during a subsequent application of rules to a storage area network configuration under test (e.g., all or part of a storage area network).

In step 1330, based on a selected rule identifier in the listing, the rule engine 145 initiates display of a graphical user interface 150 enabling the respective user 108 to create custom user-defined conditions 108 for purposes of indicating under what circumstances to generate corresponding rule message information (e.g., advisories) for viewing by the respective user 108 if the selected rule fails during a subsequent application of the selected rule to validate the storage area network configuration.

Figure 14:
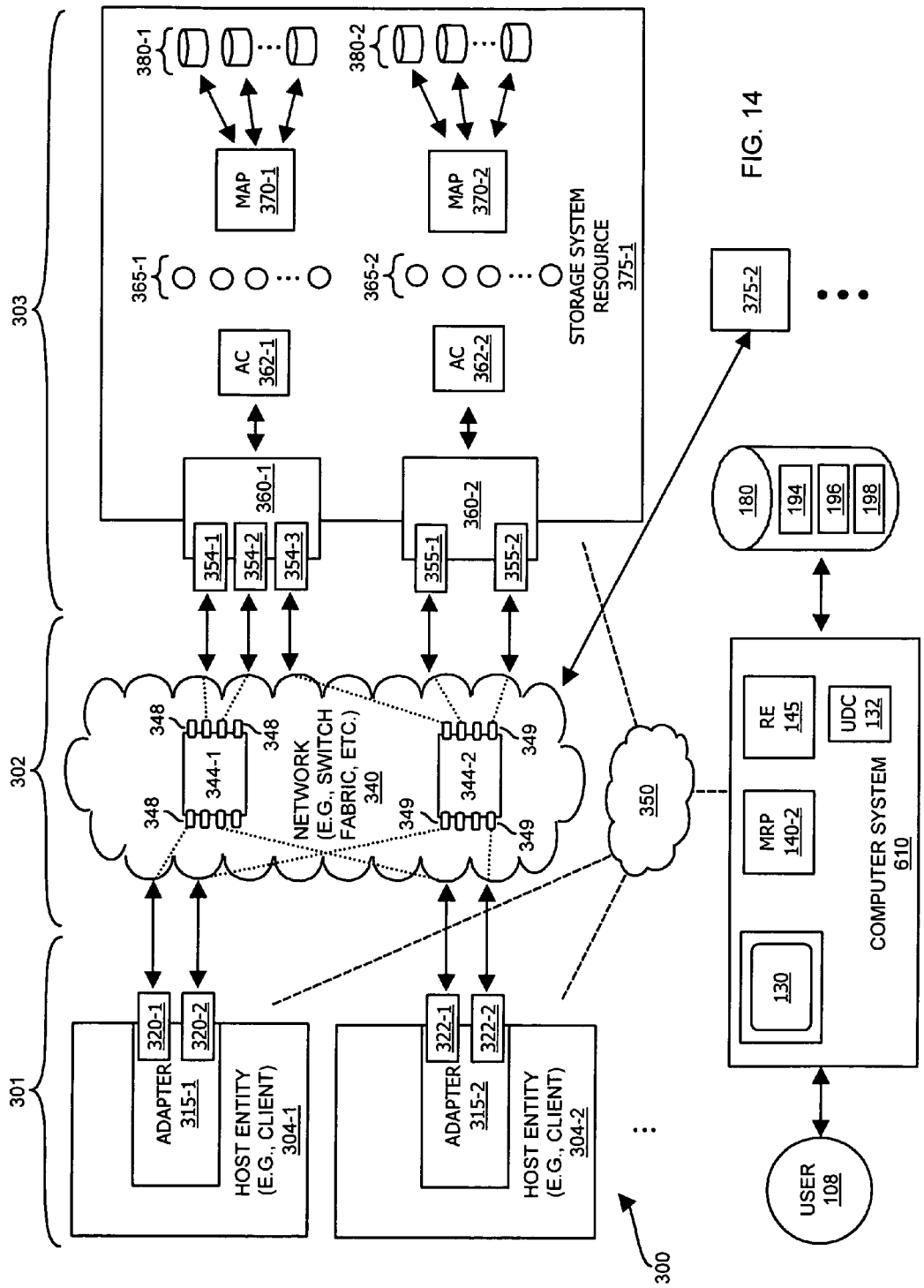
FIG. 14 is a block diagram illustrating resources in a storage area network environment represented by managed objects according to an embodiment herein.

FIG. 14 is a block diagram more particularly illustrating an example of connectivity associated with different types of resources (e.g., host resources 301, switch resources 302, and storage resources 303) in a storage area network environment 300 and different resources that can be tested via rules according to an embodiment herein. As previously discussed, the different types of resources in a system such as storage area network environment 300 can be represented by managed objects and/or corresponding relationship information stored in repository 180 as SAN configuration information 194.

As previously discussed for FIG. 1, rule engine 145 can apply rule logic 118 for purposes of producing message data 155. Message rendering process 140-2 can detect a display context associated with matter on display screen 130 and conditionally create and display pertinent rule violation messages for viewing on display screen 130 for user 108.

In one embodiment, the message rendering process 140-2 populates the messages 135 on display screen 130 depending on message data 155 generated by rule engine 145. User-defined conditions enable a respective user 108 to customize rules and control which rules can generate respective advisories for viewing on display screen 130.

Now referring more particularly to the individual or combination of resources as shown in FIG. 14, storage area network environment 300 includes host entity 304-1 (e.g., a server), host entity 304-2, ... (collectively, host entities 304), network 340 (e.g., a high speed fiber-based switch fabric), network 350 (e.g., LAN, WAN, Internet, intranet, etc.), storage system resource 375-1, storage system resource 375-2, computer system 610, and repository 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

As previously discussed, one purpose of rule engine 145 is to validate a configuration associated with a system such as storage area network environment 300. The message rendering process 140-2 initiates display of violations, warnings, and/or informational messages for viewing on display screen 130 by user 108. Each host entity 304 may be limited to accessing certain storage devices 365 in storage system resource 375-1 based at least in part on configuration settings of switch devices 344 of network 340.

As discussed above, techniques herein are well suited for use in applications such as application of rules associated with a respective storage area network environment. However, it should be noted that configurations herein are not limited to such use and thus configurations herein and deviations thereof are well suited for use in other environments that generate messages as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A computer-implemented method comprising:
   maintaining a set of rules for purposes of validating a storage area network configuration, wherein the maintaining is performed by a computer processor that executes software instructions retrieved from computer storage;
   displaying a hierarchical tree of storage area network resources present in the storage area network configuration;
   displaying a visual indication for a respective storage area network resource in the hierarchical tree, the visual indication indicating that a rule violation occurred for the respective storage area network resource based on application of the set of rules, the visual indication indicating that at least one advisory message was generated for the respective storage area network resource based on a previous application of the set of rules to the storage area network configuration, the at least one advisory message indicating the rule violation associated with at least one rule from the set of rules; and
   displaying the at least one rule from the set of rules, display of the at least one rule indicating that the rule violation occurred for the at least one rule;
   wherein displaying the at least one rule occurs in response to a user providing input with respect to the respective storage area network resource in the hierarchical tree to view the at least one advisory message;
   receiving selection of the displayed at least one rule;
   for the at least one rule and subsequent to receiving the selection, receiving a user-defined condition pertaining to generation of respective rule message information associated with the at least one rule in the set of rules; and
   applying the user-defined condition to prevent a subsequent generation of the respective rule message information associated with the at least one rule.

2. A computer-implemented method as in claim 1, wherein applying the user-defined condition prevents subsequent application of the at least one rule to a grouping of resources in the storage area network configuration as specified by the user-defined condition, the subsequent application of the at least one rule being used for: i) validating the storage area network configuration, and ii) limiting a number of advisory messages generated for the grouping of resources based on application of the at least one rule.

3. A computer-implemented method as in claim 1, wherein receiving the user-defined condition occurs in response to a respective user:
   selecting a resource associated with the storage area network configuration;
   viewing a display screen displaying i) rule message information associated with the selected resource, the rule message information being generated based on a previous application of the at least one rule to the selected resource, and ii) a rule identifier identifying the at least one rule;
   selecting the rule identifier associated with the at least one rule; and
   generating the user-defined condition for the at least one rule to prevent a future display of the rule message information on the display screen during a subsequent application of the set of rules to the storage area network configuration.

4. A computer-implemented method as in claim 1 further comprising:
   receiving selection of a resource associated with the storage area network configuration.

5. A computer-implemented method as in claim 4, wherein receiving selection of the at least one rule further comprises:
   receiving selection of a rule identifier associated with the at least one rule in response to a respective user viewing a display screen displaying i) rule message information associated with the at least one rule, and ii) a rule identifier value associated with the at least one rule, the rule identifier value indicating that a previous application of the at least one rule produced the rule message information displayed on the display screen.

6. A computer-implemented method as in claim 5 further comprising:
   in response to receiving the selection of the rule identifier, initiating display of a graphical user interface enabling the respective user to generate the user-defined condition to prevent a future display of subsequently generated rule message information associated with the at least one rule on the display screen.

7. A computer-implemented method as in claim 1 further comprising:
   initiating display of a graphical user interface including a listing of at least a portion of the set of rules and corresponding information indicating whether a respective user-defined condition applies to any rules in the portion of the set of rules displayed in the listing.

8. A computer-implemented method as in claim 7 further comprising:

initiating display of the graphical user interface to include a filter function enabling a respective user viewing the listing to select a subset of the set of rules and view corresponding information associated with the subset to identify whether any rules in the subset have any related user-defined conditions indicating conditions in which to apply a respective rule in the subset during a subsequent application of rules to the storage area network configuration.

9. A computer-implemented method as in claim 8 further comprising:
based on a selected rule identifier in the listing, initiating display of a graphical user interface enabling the respective user to create custom conditions for purposes of indicating under what circumstances to generate corresponding rule message information for the respective user if the selected rule fails during a subsequent application of the selected rule to validate the storage area network configuration.

10. A computer-implemented method as in claim 1 further comprising:
initiating display of a graphical user interface including a first listing of at least a portion of the set of rules and corresponding information indicating whether a respective user-defined condition applies to any rule in the portion of the set of rules displayed in the first listing;
receiving a command from a respective user viewing the first listing to initiate a copy function associated with a selected rule in the first listing; and
in response to receiving the command, initiating display of a graphical user interface enabling the respective user to copy a set of conditions associated with the selected rule from the first listing to at least one other rule displayed in a second listing such that the set of conditions associated with the selected rule from the first listing is copied to each of the at least one other rule displayed in the second listing.

11. A computer-implemented method as in claim 1 further comprising:
initiating display of unpopulated message format information for the at least one rule, the unpopulated message format information used for generating the respective rule message information associated with the at least one rule so that a respective user can identify the respective rule message information that will be prevented from being displayed to the respective user as a result of applying the user-defined condition during a subsequent application of the set of rules to the storage area network configuration; and
displaying the unpopulated format information to include at least one generic placeholder for subsequently populating and specifying a particular resource in the storage area network to which the message pertains upon generation of an advisory message for the particular resource.

12. A computer-readable storage medium having instructions stored thereon for processing data information, such that the instructions, when executed by a processing device, enable the processing device to perform steps of:
displaying a hierarchical tree of storage area network resources present in a storage area network configuration;
displaying a visual indication for a respective storage area network resource in the hierarchical tree, the visual indication indicating that a rule violation occurred for the respective storage area network resource based on application of a set of rules, the visual indication indicating that at least one advisory message was generated for the respective storage area network resource based on a previous application of the set of rules to the storage area network configuration, the at least one advisory message indicating the rule violation associated with at least one rule; and
displaying the at least one rule from the set of rules on a display screen, display of the at least one rule indicating that the rule violation occurred for the at least one rule;
wherein displaying the at least one rule occurs in response to a user providing input with respect to the respective storage area network resource in the hierarchical tree to view the at least one advisory message;
receiving selection of the at least one rule;
for the selection of the at least one rule, maintaining a set of rules for purposes of validating a storage area network configuration;
receiving a user-defined condition pertaining to generation of respective rule message information associated with the at least one rule in the set of rules; and
applying the user-defined condition to prevent subsequent generation of the respective rule message information associated with the at least one rule.

13. The computer-readable storage medium as in claim 12, wherein receiving the user-defined condition includes:
receiving an indication of which types of resources in the storage area network configuration to prevent generation of the respective rule information message upon a subsequent application of the at least one rule to test the storage area network configuration.

14. A computer system comprising:
a processor;
a memory unit that stores instructions associated with an application executed by the processor; and
an interconnect coupling the processor and the memory unit, enabling the computer system to execute the application and perform operations of:
maintaining a set of rules for purposes of validating a storage area network configuration;
displaying a hierarchical tree of storage area network resources present in the storage area network configuration;
displaying a visual indication for a respective storage area network resource in the hierarchical tree, the visual indication indicating that a rule violation occurred for the respective storage area network resource based on application of the set of rules, the visual indication indicating that at least one advisory message was generated for the respective storage area network resource based on a previous application of the set of rules to the storage area network configuration, the at least one advisory message indicating the rule violation associated with the at least one rule; and
displaying the at least one rule from the set of rules on a display screen, display of the at least one rule indicating that the rule violation occurred for the at least one rule;
wherein displaying the at least one rule occurs in response to a user providing input with respect to the respective storage area network resource in the hierarchical tree to view the at least one advisory message;
receiving selection of the at least one rule;
for the selection of the at least one rule, receiving a user-defined condition pertaining to generation of respective rule message information associated with the at least one rule in the set of rules; and applying the user-defined condition to prevent subsequent generation of the respective rule message information associated with the at least one rule.

15. A computer-implemented method as in claim 1 further comprising:
displaying unpopulated message format information, the unpopulated message format information data used for generating the respective rule message information associated with the at least one rule, display of the unpopulated message format information enabling the user to at least partially identify the respective rule message information that will be prevented from being displayed as a result of applying the user-defined condition during a subsequent application of the at least one rule to validate the storage area network configuration; and
displaying the unpopulated message format information to include at least one generic placeholder, the at least one generic placeholder used as a location to specify a particular resource in the storage area network to which the message pertains upon generation of a respective advisory message for the at least one rule.

16. A computer-implemented method as in claim 15, wherein displaying the unpopulated message format information includes:
displaying a first message format type associated with individual message information generated in response to a single failure associated with the at least one rule; and
displaying a second message format type associated with combined message information generated in response to multiple failures associated with the at least one rule.

17. A computer-implemented method as in claim 1 further comprising:
in response to receiving selection of the displayed at least one rule, initiating display of a graphical user interface for receiving the user-defined condition from the user; and
based on receiving further input from the user, displaying a window of the graphical user interface to include multiple data fields, the user populating the multiple data fields to limit application of the at least one rule to a specified subset of resources in the storage area network configuration on a subsequent validation of the storage area network configuration using the at least one rule.

18. A computer-implemented method as in claim 17 further comprising:
in the graphical user interface, displaying an identifier of the at least one rule to indicate the at least one rule for which the user-defined condition is being created; and
displaying resource type information along with the identifier, the resource type information indicating to which of multiple types of storage area network resources the at least one rule can be selectively applied.

19. A computer-implemented method as in claim 18, wherein displaying the graphical user interface further comprises:
displaying a first selectable display region and a second selectable display region in the graphical user interface;
responsive to selection of the first display region, displaying the window of the graphical user interface to enable the user to create the user-defined condition; and
responsive to selection of the second display region, displaying unpopulated message format information in lieu of displaying the window enabling the user to create the user-defined condition, the unpopulated message format information being displayed so that the user can at least partially identify the respective rule message information that will be prevented from being displayed to the user as a result of applying the user-defined condition during a subsequent application of the set of rules to the storage area network configuration; and
displaying the unpopulated message format information to include display of at least one generic placeholder, upon generation of an advisory message for the at least one rule, the at least one generic placeholder subsequently populated to specify a particular resource in the storage area network to which the advisory message pertains.

* * * * *